United States Patent [19]

Peter

[11] Patent Number: 5,989,326
[45] Date of Patent: Nov. 23, 1999

[54] DYES FOR INK JET PRINTING

[75] Inventor: Heinz Peter, Fribourg, Switzerland

[73] Assignee: Ilford Imaging Switzerland GmbH, Switzerland

[21] Appl. No.: 09/017,588

[22] Filed: Feb. 3, 1998

[30] Foreign Application Priority Data

Feb. 13, 1997 [EP] European Pat. Off. .............. 97102274

[51] Int. Cl.$^6$ .................................................. C09D 11/02
[52] U.S. Cl. ......................................... 106/31.52; 534/837
[58] Field of Search ........................ 106/31.52; 534/837

[56] References Cited

U.S. PATENT DOCUMENTS

| | | | |
|---|---|---|---|
| 4,626,284 | 12/1986 | Ohta et al. ............................ | 106/31.52 |
| 4,703,113 | 10/1987 | Baxter et al. ............................ | 534/796 |
| 4,724,001 | 2/1988 | Ohta et al. ............................ | 106/31.52 |
| 4,963,189 | 10/1990 | Hindagolla ............................ | 106/22 |
| 5,053,495 | 10/1991 | Greenwood et al. .................... | 534/829 |
| 5,198,022 | 3/1993 | Aulick et al. ............................ | 106/22 |

FOREIGN PATENT DOCUMENTS

| | | | |
|---|---|---|---|
| 0425150A2 | 5/1991 | European Pat. Off. ........ | C09D 11/00 |
| 0597672A2 | 5/1994 | European Pat. Off. ........ | C09D 11/00 |
| 0612820A2 | 8/1994 | European Pat. Off. ........ | C09D 11/00 |
| 0693537A2 | 1/1996 | European Pat. Off. ....... | C09D 62/513 |
| 3436891A | 4/1985 | Germany ....................... | C09D 11/00 |
| 3616128A1 | 11/1986 | Germany ....................... | C09B 31/08 |
| 59-93766 | 5/1984 | Japan ............................. | C09D 11/00 |
| 4-304273 | 10/1992 | Japan ............................. | C09D 11/02 |
| 04304274 | 3/1993 | Japan . | |
| 7-268256 | 10/1995 | Japan ............................. | C09D 11/00 |
| 635361 | 3/1983 | Switzerland ................... | C09B 31/08 |
| 2289473A | 11/1995 | United Kingdom ............ | C09B 31/08 |
| WO 95/31505 | 11/1995 | WIPO ............................. | C09B 31/08 |

OTHER PUBLICATIONS

Analytical Report, Photographic Gelatin ST 71,810 Deutsche Gelatinefabrikin (DGF Stoess), Jun. 1995.
Olin Chemical Specialities Specifications–Glycidol Surfactant 10G, 1989, no month.

*Primary Examiner*—Helene Klemanski
*Attorney, Agent, or Firm*—Ostrager Chong Flaherty & Onofrio

[57] ABSTRACT

Disazo dyes formula (VIII)

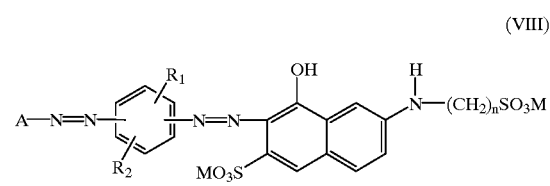

or of formula (IX)

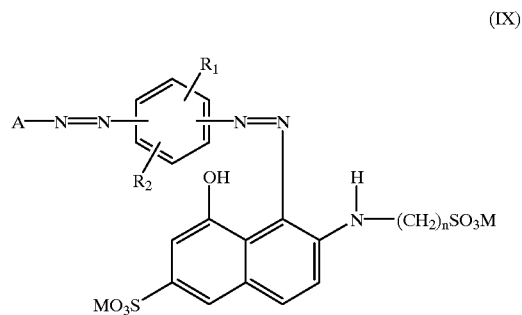

Where A, $R_1$, $R_2$, n and M are as defined in the specification are excellent dyes for ink jet printing.

10 Claims, No Drawings

DYES FOR INK JET PRINTING

FIELD OF THE INVENTION

This invention relates to novel disazo dyes and to aqueous recording liquids comprising these dyes for ink jet printing processes.

BACKGROUND OF THE INVENTION

Ink jet printing systems generally are of two types: continuous stream or drop-on-demand. In continuous stream ink jet systems, ink is emitted in a continuous stream through an orifice or nozzle. The stream is perturbed, causing it to break up into droplets at a defined distance from the nozzle. At the break up point, the droplets are charged in accordance with digital data signals and passed through an electrostatic field which adjusts the trajectory of each droplet in order to direct it to a specific location on a recording medium or to a waste ink collecting recipient (e.g. for recirculation). In drop-on-demand systems, a droplet is expelled from a nozzle to a position on a recording medium in accordance with digital data. A droplet is not formed or expelled unless it is to be placed on the recording medium.

The most important part of an ink used in ink jet printing are the dyes. Although a number of dyes have been proposed none has been produced which meets all the requirements of a modern printing process.

C.I. FoodBlack 2 (formula I) and dyes having similar structures have been mentioned as black dyes for ink jet inks in JP patent application Ser. No. 59-093,766. These dyes, however have a somewhat bluish hue and give images with poor light fastness.

Black dyes of formula (II) or mixtures thereof have been described for example in U.S. Pat. No. 4,626,284

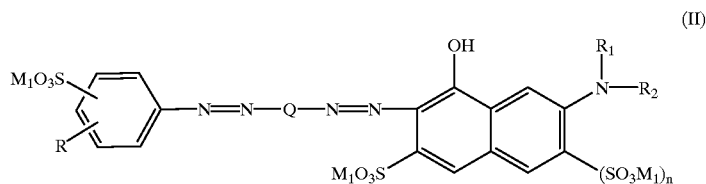

wherein Q represents a phenylene or naphthalene group substituted by a group shown by $SO_3M_1$; R represents a hydrogen atom, a lower alkyl group, a lower acylamino group, a nitro group or a halogen atom; $R_1$ represents a phenyl group substituted by a group shown by $SO_3M_1$ or a group shown by $COOM_1$, a lower alkyl group substituted by $COOM_1$, or a lower alkylaminocarbonyl lower alkyl group; $R_2$ represents a hydrogen atom, a lower alkyl group substituted by a group shown by $COOM_1$, or a lower alkylaminocarbonyl lower alkyl group; $M_1$ represents an alkali metal atom or an ammonium cation; and n represents 0 or 1.

Black dyes of formula (III) or mixtures thereof have been described for example in U.S. Pat. No. 4,724,001

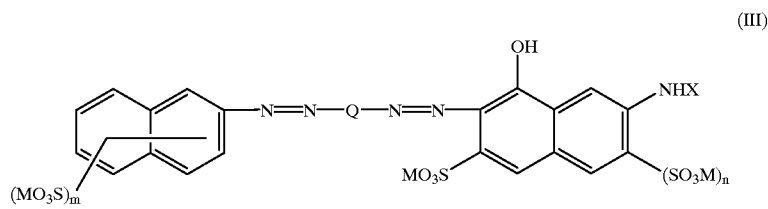

wherein Q represents a phenylene group substituted by a methyl group, a methoxy group or an ethoxy group or a naphthalene group substituted by $SO_3M$; X represents a hydrogen atom or a phenyl group substituted by $SO_3M$; m represents 1 or 2; n represents 1 when X represents a hydrogen atom and n represents 0 when X represents a phenyl group substituted by $SO_3M$, wherein X represents a hydrogen atom and m represents 1 when Q represents a

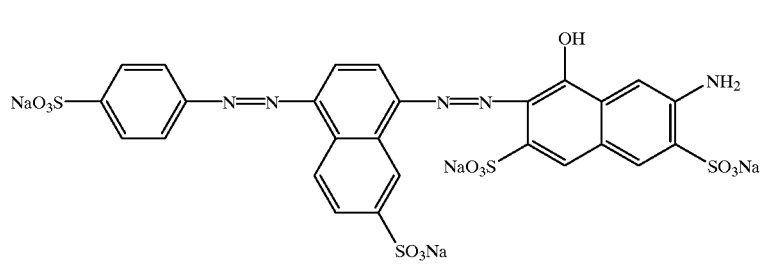

(C.I. FoodBlack 2)

naphthalene group substituted by SO₃M; and M represents an alkali metal atom or an ammonium cation.

Anionic black dyes of general formula (IV) are described in U.S. Pat. No. 5,053,495

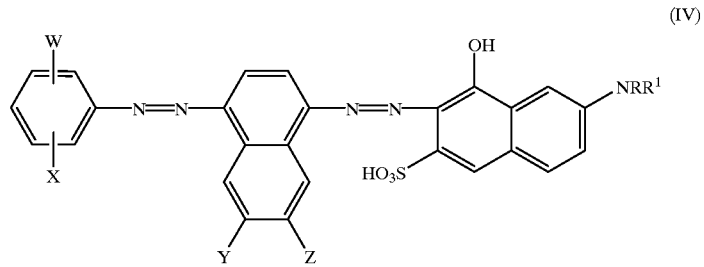

(IV)

where W is COOH; X is selected from the group consisting of hydrogen, COOH, SO₃H, halo, hydroxy, nitro, cyano, alkyl with 1 to 6 C atoms, alkoxy with 1 to 6 C atoms and acylamino with 1 to 6 C atoms; Y is hydrogen, COOH or SO₃H; Z is hydrogen, COOH or SO₃H, R and R¹ are independently hydrogen or alkyl from 1 to 6 C atoms substituted by 0, 1 or 2 COOR² groups; and R² is hydrogen or alkyl from 1 to 6 C atoms provided that there are at least two COOH groups and that the number of COOH groups is equal to or greater than the number of SO₃H groups.

These dyes are claimed to give differential water solubility depending upon pH. On a plain paper substrate with a pH from 5 to 7 the water solubility of these dyes is much lower than at higher pH and therefore the dyes will be more resistant to removal from the substrate by washing.

Such dyes, however, give rise to a poor smudge behaviour due to bronzing (association of the dye on the surface of the recording material). Although they can provide pure blacks on plain paper or coated paper, these dyes may provide a somewhat bluish hue on other recording media.

Black dyes with improved water fastness of general formula (V) have been described in EP Patent Application 0,612,820

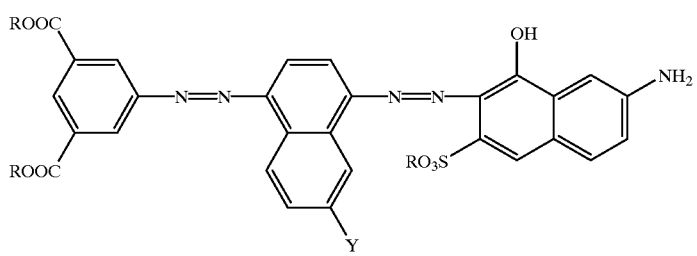

(V)

where R is NH₄ and Y is hydrogen or SO₃R. These dyes, however, do not show a neutral hue and a yellow dye needs to be included in the black ink.

In EP Patent Application 0,597,672 black dyes of structure (VI) are described

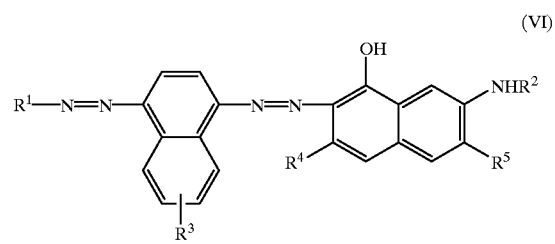

(VI)

where R¹ represents a phenyl or naphthyl group which may be substituted by a hydroxyl group, NH₂, SO₃M or COOM wherein M represents a hydrogen atom, or a cation species derived from an alkali metal, ammonia or an amine; R² represents a carboxyalkyl group wherein the carboxy group may form a salt with an alkali metal or ammonia, a substituted or unsubstituted alkoxyalkyl group or a substituted or unsubstituted phenyl or alkanoyl group, and R³, R⁴ and R⁵, which may be the same or different, each independently represents a hydrogen atom or SO₃M wherein M is defined as above, provided that R¹ does not represent a phenyl group substituted with SO₃M when R³, R⁴ and R⁵ all represent SO₃M.

These dyes, however, do not show a neutral black hue and a yellow dye needs to be included in the black ink.

Of the compounds represented by the general formula (VI) wherein R¹ represents a phenyl group substituted by SO₃H and where R³, R⁴ and R⁵ all represent SO₃H only a few dyes having particular structures can be combined with other dyes, because other combinations deteriorate the storage stability of the inks or the light fastness of the prints.

Black disazo dyes of formula (VII) are described in GB Patent Application 2,289,473 and WO Patent Application 95/31505

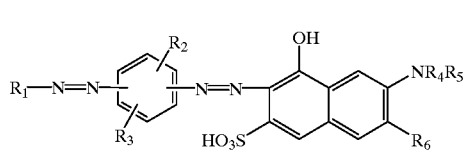

(VII)

wherein $R_1$ is optionally substituted phenyl or optionally substituted naphthyl; $R_2$ is hydrogen, halo, COOH, $SO_3H$, optionally substituted alkyl, optionally substituted alkoxy or optionally substituted alkylthio; $R_3$ is $NR_7R_8$; $R_4$ is hydrogen or optionally substituted alkyl; $R_5$ is hydrogen, optionally substituted alkyl or phenyl; R6 is hydrogen or $SO_3H$; $R_7$ is hydrogen or optionally substituted alkyl, $R_8$ is optionally substituted acyl.

Black disazo dyes of formula (VII) are described in JP Patent Application 07-268,256 where $R_1$ is optionally substituted phenyl, $R_2$ is branched alkyl or branched alkoxy with 1 to 8 C atoms; $R_3$ is alkoxy with 1 to 9 C atoms; $R_4$ is hydrogen, optionally substituted phenyl, $CH_2COOH$ or $C_2H_4COOH$; $R_5$ is hydrogen and $R_6$ is hydrogen or $SO_3H$.

Black disazo dyes of formula (VII) where $R_1$ is carboxyphenyl; $R_2$ and $R_3$ are hydrogen, methyl or methoxy; $R_4$ is hydrogen; $R_5$ is phenyl or carboxyphenyl and $R_6$ is hydrogen are described in JP Patent Application 04-304,274.

Black disazo dyes of formula (VII), where $R_1$ is optionally substituted carboxyphenyl; $R_2$ is alkyl or alkoxy with 1 to 4 C atoms or $CH_2COOH$; $R_3$ is alkoxy with 1 to 4 C atoms; $R_4$ is hydrogen; $R_5$ is hydrogen, alkyl with 1 to 4 C atoms or $CH_2COOH$ and $R_6$ is hydrogen are described in U.S. Pat. No. 5,198,022. All these dyes are to be substituted by one or more carboxy or carboxy alkyl groups, preferably they contain at least as many COOH groups as $SO_3H$ groups.

Dyes containing COOH groups however tend to cause "crusting" resulting in a "poor first ejection" according to EP Patent Application 0,612,820.

Dyes of the above mentioned structures considered to be state of the art do not satisfy all the required demands when used in aqueous inks for ink jet printing.

Dyes used for such recording liquids have to be sufficiently soluble, do not show bronzing on recording materials (association of the dye on the surface of the recording material), they have to be stable even when the recording liquid is stored for a long period of time, they need to provide printed images having high optical density, excellent water fastness and excellent light fastness.

Various types of compositions have been proposed as inks for use in ink jet printing. Typical inks are composed of various types of dyes, water, organic cosolvents and other additives.

In particular the inks have to meet the following criteria:

(1) The ink gives high quality images on any type of recording medium.
(2) The ink gives printed images exhibiting excellent water fastness.
(3) The ink gives printed images exhibiting excellent light fastness.
(4) The ink does not clog jetting nozzles even when these are kept uncapped while recording is suspended.
(5) The ink is quickly fixed onto recording media without bronzing and can not therefore be scrubbed off.
(6) The ink can be stored for a long period of time without deterioration in its performance.
(7) Physical properties of the inks, such as viscosity, conductivity and surface tension, are each within a defined range.
(8) The recording liquid has to be safe, non toxic and not flammable.

Reactive black dyes have also been proposed for ink jet printing for example in EP Patent Application 0,693,537. However, inks containing dyes with incorporated reactive groups deteriorate the storage stability of the inks and due to their potential health risk they are less suitable for handling in a non chemical environment.

DESCRIPTION OF THE INVENTION

This invention relates to novel black disazo dyes suitable for ink jet printing which provide images having neutral black colour, high optical density, high solubility, excellent water fastness, excellent light stability and no or little association of the dye on the recording material (bronzing).

Another object of the present invention is to provide ink compositions for ink jet printing excellent in blackness on different ink receiving materials, such as plain papers, coated papers or sheets of synthetic material.

A further object of the present invention is to provide ink compositions satisfying all the requirements mentioned above.

Another object of the present invention is to provide black recording liquids which meet commercial requirements.

According to a first aspect of the present invention there are provided new black dyes of formula (VIII)

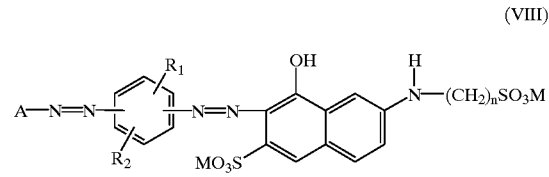

(VIII)

or formula (IX)

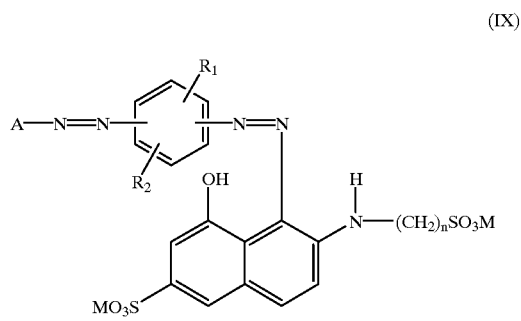

(IX)

wherein
A is optionally substituted phenyl or optionally substituted naphthyl;
$R_1$ is hydrogen, alkyl, optionally substituted alkyl, alkoxy, optionally substituted alkoxy, thioalkoxy, optionally substituted thioalkoxy, halo, COOM or $SO_3M$;

$R_2$ is alkyl, optionally substituted alkyl, alkoxy or optionally substituted alkoxy;

n is 2 to 4; and

M is hydrogen, a metal atom, preferentially an alkali metal atom, ammonium or ammonium substituted with alkyl, alkoxyalkyl or hydroxyalkyl each having 1 to 12 C atoms.

When A is substituted phenyl it preferably carries from one to three substituents selected from sulpho, carboxy, carboxamido, N-substituted carboxamido as for example N-carboxymethylcarboxamido or N-(2-adipyl)-carboxamido; alkyl with 1 to 18 C, atoms, preferably with 1 to 4 C atoms, substituted alkyl as for example hydroxymethyl, carboxymethyl, sulphomethyl, phosphonomethyl, hydroxyethyl, carboxyethyl, cyanoethyl, 4-carboxybutyl; halogen, hydroxy, cyano, alkoxy with 1 to 18 C atoms, preferably with 1 to 4 C atoms; substituted alkoxy as for example 2-hydroxyethyloxy or ω-sulphoalkoxy; alkylthio, substituted alkylthio as for example ω-sulphoethylthio or ω-sulphopropylthio. It is still more preferred that when A is substituted phenyl one of its substituents is sulpho or carboxy and one or two substituents are selected from hydrogen, chloro, hydroxy, alkoxy or carboxy.

When A is substituted naphthyl it preferably carries from one to three substituents selected from sulpho, carboxy or hydroxy. It is preferred that the naphthyl is substituted by one to three sulpho groups, more preferably by one or two sulpho groups.

When $R_2$ is alkyl $R_1$ is hydrogen, alkyl, alkoxy or substituted alkoxy as for example 2-hydroxyethoxy, ω-sulphoalkoxy, 2-hydroxy-3-sulphopropoxy; alkylthio or substituted alkylthio as for example 3-sulphopropylthio; sulpho or carboxy.

The compounds of formulas (VIII) and (IX) may be in the free acid form or an inorganic or organic salt thereof. They are preferably in the form of their salts with cations such as alkali metal, ammonium or optionally substituted ammonium or mixtures of such cations.

In a preferred embodiment of the invention the compounds of formulas (VIII) and (IX) the two azo groups are in para relationship across the central phenylene group and $R_1$ is also in para position to $R_2$. It is also preferred that $R_2$ is ortho to the azo group linking A to the central phenylene moiety.

It is further preferred that the compounds of formulas (VIII) and (IX) have at least as many sulpho groups as carboxy groups, preferably more sulpho groups than carboxy groups and that n is equal to 2.

Especially preferred are compounds of Formula (X)

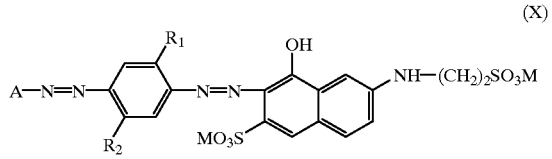

(X)

and formula (XI)

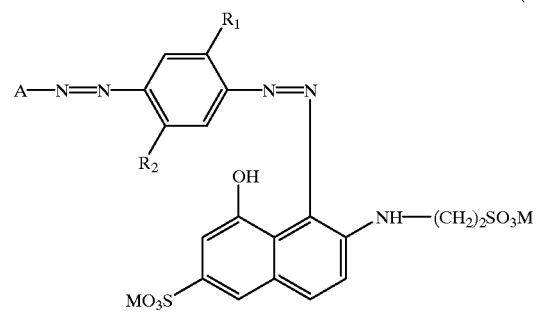

(XI)

wherein the substituents are as described above.

The compounds of formulas (X) and (XI) may be in the free acid form or in the form of inorganic or organic salts thereof, but they are preferably in the form of their salts with cations such as alkali metal, ammonium or optionally substituted ammonium or mixtures of such cations. Examples of substituted ammonium cations include 2-hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium as for example tetramethylammonium or tetrabutylammonium.

It is to be understood that the present invention covers all tautomeric forms of the compounds of formulas (VIII), (IX), (X) and (XI).

The present invention relates not only to compounds of formulas (VIII), (IX), (X) and (XI), but also to mixtures comprising two or more compounds of formulas (VIII), (IX), (X) and (XI).

Dye Synthesis

The compounds according to formulas (VIII), (IX), (X) and (XI) may be prepared by methods known in the art by diazotising an amine of formula (XII)

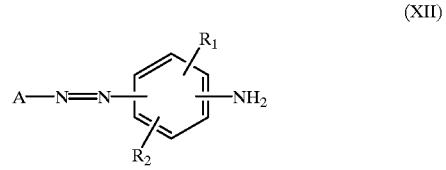

(XII)

and subsequent coupling with a compound of formula (XIII)

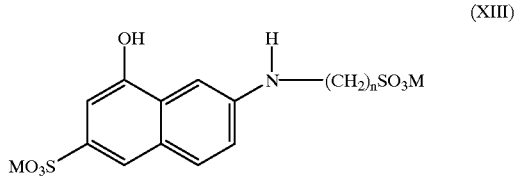

(XIII)

For example compounds of formula (XII) may be prepared by diazotising an amine of formula A—NH$_2$, preferably below 5° C., with nitrite and mineral acid, and subsequent coupling with an aniline substituted by $R_1$ and $R_2$.

The compounds of formulas (VIII), (IX), (X), (XI) and (XII) may be prepared by methods described, for example, in GB Patent Application 2,289,473 or by methods similar thereto.

Compounds of formula (XIII) may be prepared using the Bucherer reaction in which 1-hydroxy-3-sulpho-7-hydroxy (or 7-amino)-naphthalene is reacted with an amine $NH_2(CH_2)_nSO_3M$ in the presence of an alkali metal or ammonium sulphite and/or bisulphite with heating, preferably at a temperature of from 60° C. to 100° C.

The present invention will be illustrated in more detail by the following examples without limiting the scope of the claimed structures in any way.

Ink Composition

Compounds or mixtures of compounds represented by formulas (VIII), (IX), (X) and (XI) are useful colorants for the preparation of black recording liquids for ink jet printing.

A suitable ink comprises one or more compounds according to the present invention and a liquid aqueous medium. The ink preferably contains from 0.5% to 20%, preferably from 0.5% to 5% by weight of the compound or compounds, based on the total weight of the ink. The liquid medium is preferably water or a mixture comprising water and water soluble or water miscible organic solvents or mixtures thereof. Examples of suitable ink media are given for example in U.S. Pat. Nos. 4,626,284, 4,703,113, 4,963,189, GB Patent Application 2,289,473 and EP Patent Applications 0,425,150 and 0,597,672.

EXAMPLES

Prepared compounds of formula (X) are listed in Table 1.

TABLE 1

| Compound No. | A | $R_1$ | $R_2$ | M |
|---|---|---|---|---|
| 1 | 3-$MO_3S$-phenyl | —$OCH_3$ | —$CH_3$ | Na |
| 2 | 3-$MO_3S$-phenyl | —$OCH_2CH_2OH$ | —$CH_3$ | Na |
| 3 | 3-$MO_3S$-phenyl | —$OCH_3$ | —$OCH_3$ | Na |
| 4 | 4,8-di($MO_3S$)-naphthyl | —$OCH_3$ | —$CH_3$ | Na |
| 5 | 4,8-di($MO_3S$)-naphthyl | —$OCH_2CH_2OH$ | —$CH_3$ | Na |
| 6 | 4,7-di($MO_3S$)-naphthyl | —$OCH_3$ | —$CH_3$ | Na |

TABLE 1-continued

| Compound No. | A | R₁ | R₂ | M |
|---|---|---|---|---|
| 7 | MO₃S-naphthalene-SO₃M (with CH₃) | —OCH₃ | —OCH₃ | Na |

A prepared compound of formula (XI) is listed in Table 2.

TABLE 2

| Compound No. | A | R₁ | R₂ | M |
|---|---|---|---|---|
| 8 | MO₃S-naphthalene-SO₃M (with CH₃) | —OCH₃ | —CH₃ | Na |

A prepared mixture of compounds of formulas (X) and (XI) is listed in Table 3.

TABLE 3

| Compound No. | A | R₁ | R₂ | M |
|---|---|---|---|---|
| 8 | MO₃S-naphthalene-SO₃M (with CH₃) | —OCH₃ | —CH₃ | Na |

TABLE 3-continued

| Compound No. | A | R₁ | R₂ | M |
|---|---|---|---|---|
| | 1:1 mixture of compounds 4 and 8 | | | |

Previously known disazo dyes according to general formula (XIV)

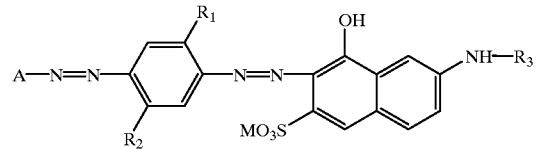

(XIV)

are listed in Table 4.

TABLE 4

| Compound No. | A | R₁ | R₂ | R₃ |
|---|---|---|---|---|
| 10 | MO₃S-naphthalene-SO₃M (with CH₃) | —H | —CH₃ | phenyl-SO₃M |
| 11 | MOOC-phenyl | —OCH₃ | —NHCOCH₃ | —H |

TABLE 4-continued

| Compound No. | A | $R_1$ | $R_2$ | $R_3$ |
|---|---|---|---|---|
| 12 | 3-MOOC-phenyl | —OCH$_3$ | —NHCOCH$_3$ | 4-COOM-phenyl |
| 13 | 3-MOOC-phenyl | —OCH$_3$ | —NHCOCH$_3$ | —CH$_2$CH$_2$COOM |
| 14 | 4-MOOC-phenyl | —OCH$_3$ | —OCH$_3$ | 4-COOM-phenyl |
| 15 | 3-MOOC-phenyl | —OCH$_3$ | —CH$_3$ | —H |

Evaluation Tests
Preparation Example of Inks

The present invention in so far as it relates to inks is further illustrated by using dyes described in Tables 1, 2 and 3. 100 g of each ink were prepared by heating the dye (3–7 g), 5 g of glycerol, 1.1 g of tetraethyleneglycole and 1.2 g of a biocide solution (Promexal X50, available from Zeneca, Manchester, England) together with water to a temperature of approximately 50° C. under stirring for one hour to make a solution, cooling it down to 20° C., adjusting pH to 7.5 and passing the solution through a Millipore® filter of 0.5 μm pore diameter. The dye quantity was adjusted in a way that the printed density was the same for all dyes.

Application Example of Inks

An ink receiving sheet for the testing procedures was prepared in the following way: 30 g gelatine with a high isoelectric point (type St 70'810, available from Deutsche Gelatinefabriken, Eberbach, Germany) were dissolved in 360 ml of deionised water. To this solution was added 1 g of a surfactant (Olin 10G, available from Olin Corporation, Norwalk, USA). Immediately before coating 6.6 g of a 3% solution of 2-(4-dimethyl-carbamoyl-pyridino)-ethane-sulfonate was added and the pH was adjusted to 6.5. 100 g/m² of this solution was then coated onto an RC paper support using a barcoater. The sheets were dried for 12 hours.

The inks were then jetted onto these receiving sheets with an HP560 ink jet printer to evaluate their printing performance. The evaluation methods for (A) dye solubility, (B) colour co-ordinates, (C) smudge resistance and (D) light fastness are as follows:

(A) Dye Solubility

The dye was dispersed or solubilised in deionised water and the dispersion or solution was stirred for one hour at 50° C. Then the mixture was cooled down to 20° C., centrifuged and filtered. The solubility of the dye was calculated a) from UV/VIS spectral data of the mother liquor (solution) or b) based on the dried filter residue.

(B) Colour Co-ordinates

L*a*b*-values were measured on printed samples using a Gretag SPM 100 spectrometer, available from Gretag AG, Regensdorf, Switzerland.

(C) Smudge Resistance

The smudge behaviour was evaluated by determining the degree of smear of the dye in images printed as described above according to the following criteria:

⊕: Little or no smear
◊: Slight smear
Ø: Severe smear (D) Light Stability

The printed samples were irradiated in an Atlas Ci35A Weather-O-Meter® with a 6500 W Xenon lamp until a total illumination of 20 kJoule/cm² was reached. The loss of density was measured with an X-Rite® densitometer and is expressed in % loss of initial density.

The solubilities of the dyes determined as described above are shown in Table 5.

TABLE 5

| Dye No. | Solubility (in g per 100 ml) |
|---|---|
| 2 | >20 |
| 4 | >20 |
| 6 | >20 |
| 12 | 3.6 |
| 14 | 17 |

The dyes 2, 4 and 6 according to this present invention show a much higher solubility than the previously known black disazo dyes 12 and 14.

The absorption maxima and the results of the tests (B) to (D) are reported in Table 6 for the dyes of the invention and the comparative values for previously known disazo dyes in Table 7.

TABLE 6

| Compound No. | $\lambda_{max}$ in water (nm) | L*a*b*-Value | Smudge Value | Loss of Density in % |
|---|---|---|---|---|
| 1 | 569 | 10.0/13.6/−0.8 | ⊕ | 6 |
| 4 | 584 | 2.4/3.8/−0.9 | ⊕ | 3 |
| 5 | 583 | 2.6/2.4/−0.4 | ⊕ | 3.3 |
| 6 | 575 | 15.5/5.1/0.7 | ⊕ | 5 |
| 7 | 595/491 | 5.8/4.3/0.7 | ◊ | 7 |
| 9 | 580 | 2.2/2.0/0.1 | ⊕ | 4.2 |

TABLE 7

| Compound No. | $\lambda_{max}$ in water (nm) | L*a*b*-Value | Smudge Value | Loss of Density in % |
|---|---|---|---|---|
| 10 | 559 | 4.1/13.0/2.9 | ⊕ | 8.6 |
| 11 | 557 | 20.6/7.5/−1.1 | ∅ | Bronzing |
| 12 | 498 | 13.2/4.6/−3.3 | ◊ | 10.3 |
| 13 | 488 | 2.2/1.3/1.1 | ∅ | Bronzing |
| 14 | 584 | 11.1/8.1/−5.0 | ∅ | 10.6 |
| 15 | 557 | 12.9/8.1/4.0 | ∅ | Bronzing |

For black dyes to have a neutral hue, a* and b* values have to be zero. A comparison of the measured colour co-ordinates of printed samples with inks made with dyes of the present invention (Table 6) shows clearly that these dyes give more neutral blacks than samples printed with inks using previously known disazo dyes (Table 7).

As is clearly demonstrated, the previously known black disazo dyes tend to severe smear and bronzing, whereas the dyes or mixtures of dyes according to the present invention show an excellent smudge resistance and no or very low bronzing.

As is clearly shown, the dyes of the present invention (Table 6) show significantly smaller losses in density after exposure to 20 kJoule/cm² compared to dyes of the prior art (Table 7).

Comparative results were also obtained with the commercially available black inks for the HP 560 and Lexmark 4076 printers. The results for these inks are listed in Table 8.

TABLE 8

| Compound No. | L*a*b*-Value | Smudge Value | Loss of Density in % |
|---|---|---|---|
| Hewlett-Packard 560 Black | 4.7/7.3/−5.5 | ⊕ | 8.9 |
| Lexmark 4076 Black | 4.2/5.7/−1.0 | ◊ | 12.6 |

As reflected by the measured values the light fastness of the dyes according to the present invention (Table 6) is markedly improved compared to dyes in commercially available black inks (Table 8).

I claim:

1. A disazo compound of formula (VIII)

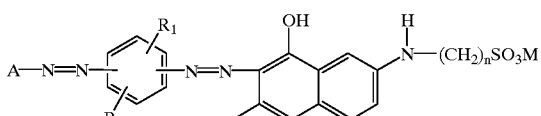

(VIII)

or of formula (IX)

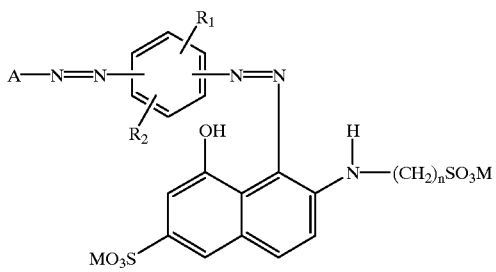

(IX)

wherein

A is optionally substituted phenyl or optionally substituted naphthyl;

$R_1$ is hydrogen, alkyl, optionally substituted alkyl, alkoxy, optionally substituted alkoxy, thioalkoxy, optionally substituted thioalkoxy, halo, COOM or $SO_3M$;

$R_2$ is alkyl, optionally substituted alkyl, alkoxy or optionally substituted alkoxy;

n is 2 to 4; and

M is hydrogen, an alkali metal atom, ammonium or ammonium substituted with alkyl, alkoxyalkyl or hydroxyalkyl each having 1 to 12 C atoms.

2. A disazo dye according to claim 1 wherein A is substituted phenyl with one to three substituents selected from the group consisting of sulpho, carboxy, carboxamido, N-substituted carboxamido; alkyl with 1 to 18 C atoms, substituted alkyl; halogen, hydroxy, cyano, alkoxy with 1 to 18 C atoms, substituted alkoxy; and alkylthio, substituted alkylthio.

3. A disazo dye according to claim 2 wherein A has one sulpho or carboxy substituent and one or two further substituents are are selected from the group consisting of hydrogen, chloro, hydroxy and carboxy.

4. A disazo dye according to claim 1 wherein A is substituted naphthyl with from one to three substituents selected from the group consisting of sulpho, carboxy and hydroxy.

5. A disazo dye of formula (X)

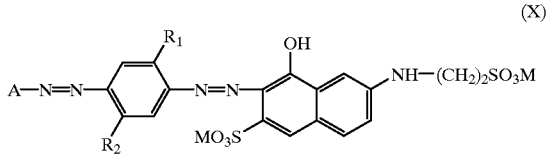

(X)

or formula (XI)

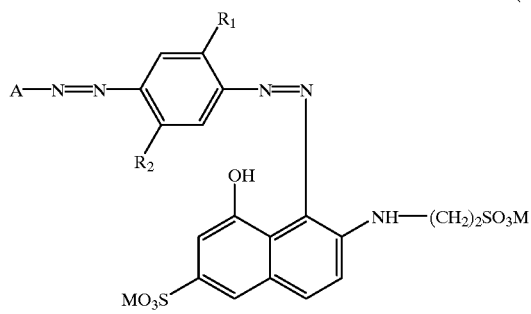

(XI)

wherein

A is optionally substituted phenyl or optionally substituted naphthyl;

$R_1$ is hydrogen, alkyl, optionally substituted alkyl, alkoxy, optionally substituted alkoxy, alkylthio, optionally substituted alkylthio, halo, COOM or $SO_3M$;

$R_2$ is alkyl, optionally substituted alkyl, alkoxy or optionally substituted alkoxy; and M is hydrogen, a metal atom, preferentially an alkali metal atom, ammonium or ammonium substituted with alkyl, alkoxyalkyl or hydroxyalkyl each having 1 to 12 C atoms.

6. A disazo dye according to claim 5 wherein A is substituted phenyl with one to three substituents selected from the group consisting of sulpho, carboxy, carboxamido, N-substituted carboxamido; alkyl with 1 to 18 C atoms, substituted alkyl; halogen, hydroxy, cyano, alkoxy with 1 to 18 C atoms, substituted alkoxy; and alkylthio, substituted alkylthio.

7. A disazo dye according to claim 5 wherein A has one sulpho or carboxy substituent and one or two further substituents are selected from the group consisting of hydrogen, chloro, hydroxy and carboxy.

8. A disazo dye according to claim 5 wherein A is substituted naphthyl with from one to three substituents selected from the group consisting of sulpho, carboxy and hydroxy.

9. An ink for ink jet printing comprising a dye or a mixture of dyes as claimed in anyone of claims 1 to 8.

10. An ink for ink jet printing which contains in addition to a dye or dyes as claimed in anyone of claims 1 to 8 one or, more other dyes.

* * * * *